United States Patent
Takano

(10) Patent No.: US 7,271,597 B2
(45) Date of Patent: Sep. 18, 2007

(54) ELECTRONIC DEVICE, TRANSMISSION SYSTEM, AND METHOD FOR DETERMINING CONNECTION CONDITION

(75) Inventor: Takashi Takano, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/551,898

(22) Filed: Oct. 23, 2006

(65) Prior Publication Data

US 2007/0091516 A1 Apr. 26, 2007

(30) Foreign Application Priority Data

Oct. 26, 2005 (JP) ............... 2005-311620

(51) Int. Cl.
  G01R 31/04 (2006.01)
  G01R 31/08 (2006.01)
  G01R 19/00 (2006.01)
  H04Q 1/24 (2006.01)
(52) U.S. Cl. .................. 324/538; 324/66; 324/527; 324/522; 340/425.2; 340/538
(58) Field of Classification Search ................ 324/538, 324/66, 522, 523, 527; 340/693.1, 538
See application file for complete search history.

(56) References Cited

U.S. PATENT DOCUMENTS

| | | | |
|---|---|---|---|
| 6,104,198 A | * | 8/2000 | Brooks ................. 324/538 |
| 6,337,569 B1 | * | 1/2002 | Ikake ................... 324/508 |
| 6,768,314 B2 | * | 7/2004 | Shimizu et al. ......... 324/538 |
| 2002/0118023 A1 | | 8/2002 | Ewalt et al. |
| 2003/0141878 A1 | * | 7/2003 | Shinzou et al. ......... 324/539 |
| 2006/0145833 A1 | * | 7/2006 | Brandt et al. ........ 340/538.11 |

FOREIGN PATENT DOCUMENTS

| | | |
|---|---|---|
| EP | 1 372 270 A1 | 12/2003 |
| GB | 2259992 | * 3/1993 |
| JP | 8-288909 | 11/1996 |

* cited by examiner

*Primary Examiner*—Anjan Deb
(74) *Attorney, Agent, or Firm*—Oblon, Spivak, McClelland, Maier & Neustadt, P.C.

(57) ABSTRACT

An electronic device has a first signal path, a first power supply path, and a connector that transmits to an external device the input signal on which the voltage has been superposed. The device also has a first power supply switch inserted into the first power supply path and an amplitude detector that detects at the connector an amplitude of the input signal, a control section that determines, based on a detection output from the amplitude detector, which a connection condition of the external device to the connector is a first condition in which the external device is not connected to the connector or a second condition in which the external device is connected to the connector. Based on the connection condition, the control section turns on or off the first power supply switch.

27 Claims, 9 Drawing Sheets

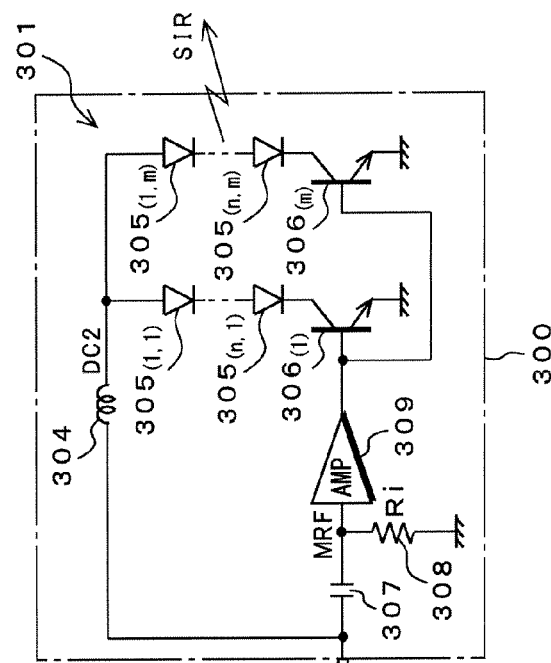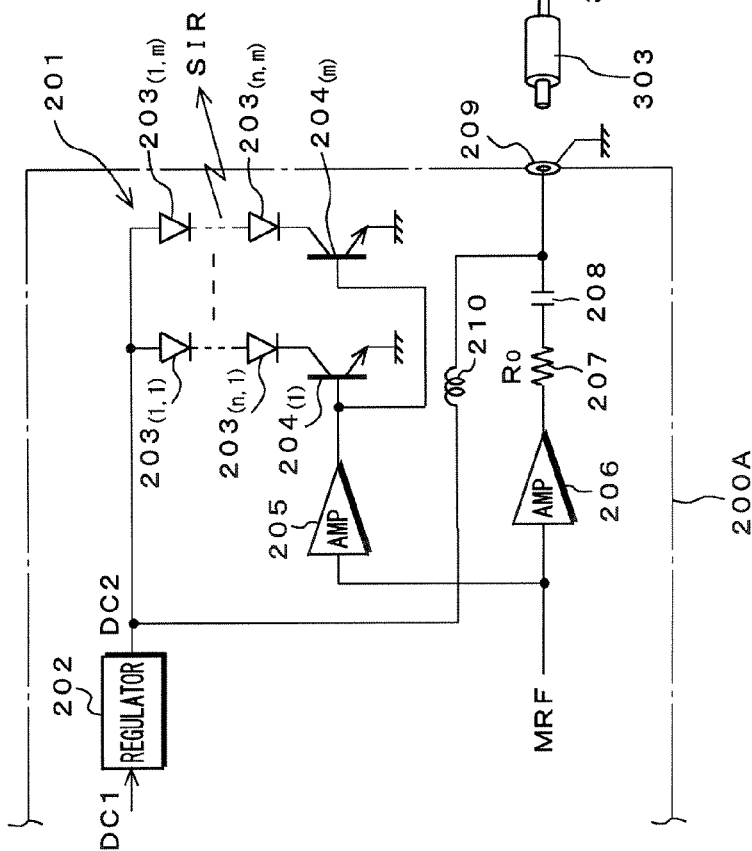
FIG. 2 (RELATED ART)

FIG. 7

| CONDITIONS / CIRCUIT | CONDITION A | CONDITION B | CONDITION C |
|---|---|---|---|
| AMPLITUDE OF MODULATED RF SIGNAL AT CONNECTOR 111 | $Vpp$ | $\frac{Ri}{Ro+Ri}Vpp$ | 0 |
| OUTPUT AMPLITUDE OF IMPEDANCE CONVERTER 122 | $Vpp$ | $\frac{Ri}{Ro+Ri}Vpp$ | 0 |
| OUTPUT AMPLITUDE OF AMPLIFIER 123 | $GVpp$ | $\frac{Ri}{Ro+Ri}GVpp$ | 0 |
| OUTPUT DC VOLTAGE OF RF DETECTOR 124 | $KGVpp$ | $\frac{Ri}{Ro+Ri}KGVpp$ | 0 |
| REFERENCE VOLTAGE Vth1 OF COMPARATOR 125 | $\frac{1}{2}\left(\frac{Ro+2Ri}{Ro+Ri}\right)KGVpp$ | $\frac{1}{2}\left(\frac{Ro+2Ri}{Ro+Ri}\right)KGVpp$ | $\frac{1}{2}\left(\frac{Ro+2Ri}{Ro+Ri}\right)KGVpp$ |
| REFERENCE VOLTAGE Vth2 OF COMPARATOR 126 | $\frac{1}{2}\left(\frac{Ri}{Ro+Ri}\right)KGVpp$ | $\frac{1}{2}\left(\frac{Ri}{Ro+Ri}\right)KGVpp$ | $\frac{1}{2}\left(\frac{Ri}{Ro+Ri}\right)KGVpp$ |
| OUTPUT CMP1 OF COMPARATOR 125 | H | L | L |
| OUTPUT CMP2 OF COMPARATOR 126 | H | H | L |
| DECISION BY SYSTEM CONTROLLER 127 | CONDITION A | CONDITION B | CONDITION C |
| CONTROL BY SYSTEM CONTROLLER 127 | POWER SUPPLY SWITCH 106 : ON<br>POWER SUPPLY SWITCH 112 : OFF | POWER SUPPLY SWITCH 106 : OFF<br>POWER SUPPLY SWITCH 112 : ON | POWER SUPPLY SWITCH 106 : HELD<br>POWER SUPPLY SWITCH 112 : OFF |

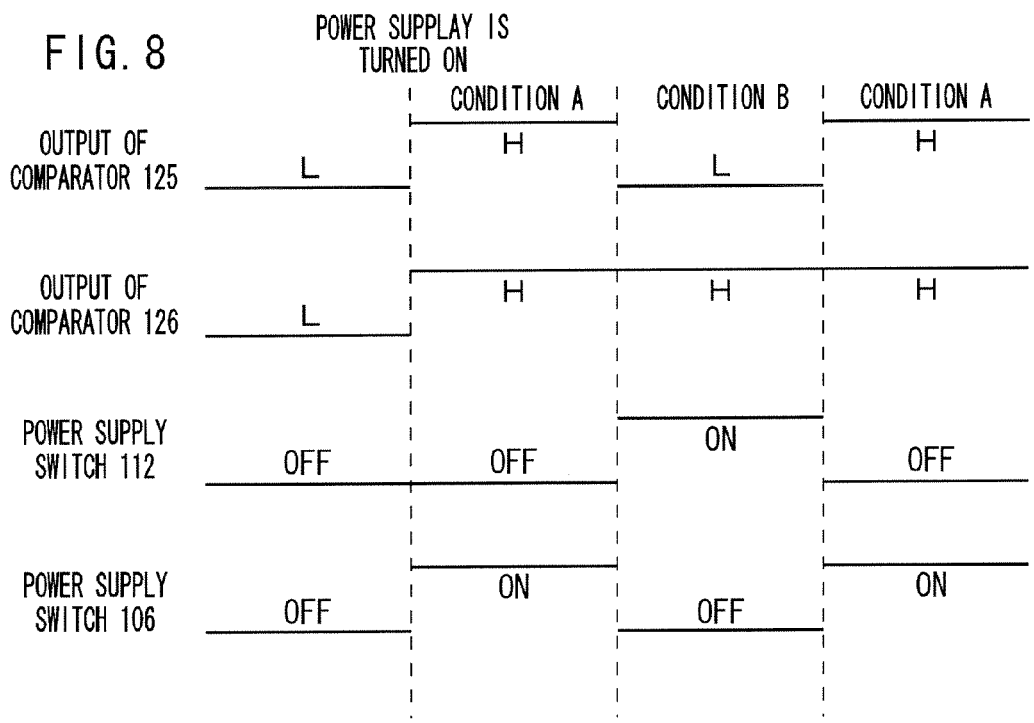
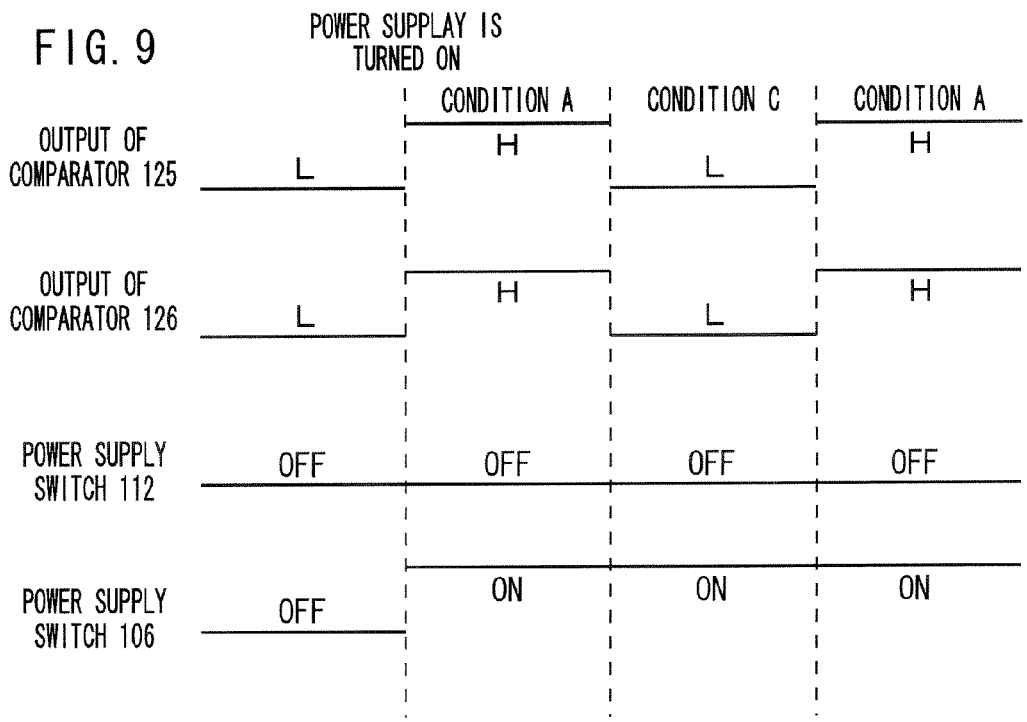

ELECTRONIC DEVICE, TRANSMISSION SYSTEM, AND METHOD FOR DETERMINING CONNECTION CONDITION

CROSS REFERENCE TO RELATED APPLICATION

The present invention contains subject matter related to Japanese Patent Application JP 2005-311620 filed in the Japanese Patent Office on Oct. 26, 2005, the entire contents of which being incorporated herein by reference.

BACKGROUND OF THE INVENTION

1. Field of the Invention

The present invention relates to an electronic device equipped with a connector for connecting an external device so as to supply, through the connector, the external device with a signal on which voltage is superposed; a transmission system for transmitting an output signal corresponding to an input signal from any signal transmission sections with which the external device and the electronic device are provided; and a method for determining a connection condition between the connector of the electronic device and the external device.

2. Description of Related Art

FIG. 1 shows an infrared optical transmission apparatus 200A as related art. This infrared optical transmission apparatus 200A is equipped with an infrared optical transmission section 201 which is configured, for example, with an infrared light-emitting diode etc. so as to output an infrared signal SIR and also with a connector, not shown in FIG. 1, for connecting an infrared optical transmission unit 300 having an infrared optical transmission section 301.

In this circumstance, when a connector (plug) 303, which is connected to an end of a connection cable 302 that is in turn connected to the infrared optical transmission unit 300, is connected to a connector (jack) of the infrared optical transmission apparatus 200A, a situation arises where a modulated RF signal, on which a DC power supply voltage is superposed, can be supplied from the infrared optical transmission apparatus 200A to the infrared optical transmission unit 300 and an infrared signal SIR that corresponds to the modulated RF signal can be output from the infrared optical transmission section 301.

FIG. 2 shows circuit configurations of the infrared optical transmission apparatus 200A and the infrared optical transmission unit 300.

The following will describe the circuit configuration of the infrared optical transmission apparatus 200A.

A DC power supply voltage DC1 of, for example, 12V obtained from a power supply circuit, not shown, is supplied to a regulator 202 from which a stabilized DC power supply voltage DC2 of, for example, 9V can be obtained.

An output side of the regulator 202 is connected to a collector of an NPN driver transistor 204(1), whose emitter is grounded, through a series circuit constituted of infrared light-emitting diodes 203(1, 1) through 203(n, 1). The output side of the regulator 202 is also connected to a collector of an NPN driver transistor 204(m), whose emitter is grounded, through a series circuit constituted of infrared light-emitting diodes 203 (1, m) through 203(n, m). Herein, n=3 and m=4, for example, are used. Thus, the n times m number of infrared light-emitting diodes 203(1, 1) through 203(n, m) constitute the infrared optical transmission section 201.

An amplifier 205 receives and amplifies a modulated RF signal MRF obtained from a modulation circuit, not shown. An output side of this amplifier 205 is connected to a base of each of the transistors 204(1) through 204(m). The modulated RF signal MRF is obtained, for example, by performing digital modulation on a carrier wave with audio data, image data or the like, and produced so as to have a constant amplitude.

An amplifier 206 also receives and amplifies the modulated RF signal MRF obtained from the modulation circuit, not shown. An output side of this amplifier 206 is connected to a connector (jack) 209 through a series circuit constituted of an output resistor 207 and a DC cut-off capacitor 208. Further, the output side of the regulator 202 described above is connected to the connector 209 via a RF cut-off inductor 210.

The following will describe operations of the infrared optical transmission apparatus 200A.

A stabilized DC power supply voltage DC2 obtained from the regulator 202 is supplied as power to the infrared optical transmission section 201. Further, the modulated RF signal MRF obtained from the modulation circuit is amplified by an amplifier 205 and then supplied as a drive signal to the base of each of the transistors 204(1) through 204(m). Accordingly, in response to the modulated RF signal MRF, the diodes 203(1, 1) through 203(n, m) emit light, so that an infrared signal SIR corresponding to the modulated RF signal MRF can be output from the infrared optical transmission section 201.

The modulated RF signal MRF obtained from the modulation circuit is amplified by the amplifier 206 and then supplied to the connector 209 through the series circuit constituted of the output resistor 207 and the DC cut-off capacitor 208. Further, the stabilized DC power supply voltage DC2 obtained from the regulator 202 is supplied to the connector 209 through the RF cut-off inductor 210. Accordingly, the modulated RF signal MRF on which the DC power supply voltage DC2 is superposed can be supplied to the connector 209.

The following will describe the circuit configuration of the infrared optical transmission unit 300.

An end of the connection cable 302 that is opposite to the end thereof to which the connector 303 has been connected is connected to one end of an RF cut-off inductor 304. The other end of this RF cut-off inductor 304 is connected to a collector of an NPN driver transistor 306(1), whose emitter is grounded, through a series circuit constituted of infrared light-emitting diodes 305 (1, 1) through 305(n, 1). This other end of the RF cut-off inductor 304 is further connected to a collector of an NPN driver transistor 306(m), whose emitter is grounded, through a series circuit constituted of infrared light-emitting diodes 305(1, m) through 305(n, m). Herein, n=3 and m=4, for example, are used. Thus, n times m number of infrared light-emitting diodes 305(1, 1) through 305(n, m) constitute the infrared optical transmission section 301.

Further, the end of the connection cable 302 that is opposite to the end thereof to which the connector 303 has been connected is grounded through a series circuit constituted of a DC cut-off capacitor 307 and an input resistor 308. A node between the capacitor 307 and the input resistor 308 is connected to a base of each of the transistors 306(1) through 306(m) through an amplifier 309.

The following describe operations of the infrared optical transmission unit 300.

When the connector (plug) 303 is connected to the connector (jack) 209 of the infrared optical transmission apparatus 200A, the end of the connection cable 302 that is opposite to the end thereof to which the connector 303 has been connected is supplied with the modulated RF signal MRF on which DC power supply voltage DC2 is superposed. For this reason, the DC power supply voltage DC2 appears at the other end of the RF cut-off inductor 304. This DC power supply voltage DC2 is supplied as power to the infrared optical transmission section 301.

Further, the node between the DC cut-off capacitor 307 and the input resistor 308 is supplied with the modulated RF signal MRF. This modulated RF signal MRF is amplified by the amplifier 309 and then supplied as a drive signal to the base of each of the transistors 306(1) through 306(m). Accordingly, the diodes 305 (1, 1) through 305(n, m) emit light in response to the modulated RF signal MRF, so that an infrared signal SIR corresponding to the modulated RF signal MRF can be output from the infrared optical transmission section 301.

FIG. 3 shows another infrared optical transmission apparatus 200B as related art. This infrared optical transmission apparatus 200B is equipped with a connector, not shown in FIG. 3, for connecting the infrared optical transmission unit 300 but, in contrast to the infrared optical transmission apparatus 200A described above, the infrared optical transmission apparatus 200B is not equipped with an infrared optical transmission section for outputting an infrared signal SIR.

In this circumstance, the connection cable 302 is connected to the infrared optical transmission unit 300 while the connector (plug) 303 that is connected to the end of the connection cable is connected to a connector (jack) of the infrared optical transmission apparatus 200B. In such a manner, a modulated RF signal on which a DC power supply voltage can be superposed is supplied to the infrared optical transmission unit 300 from the infrared optical transmission apparatus 200B. This gives rise to a condition such that an infrared signal SIR corresponding to the modulated RF signal can be output from the infrared optical transmission section 301.

FIG. 4 shows circuit configurations of the infrared optical transmission apparatus 200B and the infrared optical transmission unit 300.

The following will describe the circuit configuration of the infrared optical transmission apparatus 200B. This infrared optical transmission apparatus 200B has the same configuration as that of the infrared optical transmission apparatus 200A described above except the infrared light-emitting diodes 203(1, 1) through 203(n, m), the transistors 204(1) through 204(m), and the amplifier 205.

The following will describe operations of the infrared optical transmission apparatus 200B. The modulated RF signal MRF obtained by a modulation circuit, not shown, is amplified by the amplifier 206, and then supplied to the connector 209 through a series circuit constituted of the output resistor 207 and the DC cut-off capacitor 208. Further, the stabilized DC power supply voltage DC2 obtained from the regulator 202 is supplied to the connector 209 by way of the RF cut-off inductor 210. Accordingly, the connector 209 is provided with a modulated RF signal MRF on which the DC power supply voltage DC2 is superposed.

The infrared optical transmission system 300 has the same circuit configuration as the above-described configuration. Therefore, if the connector 303 is connected to the connector 209 of the infrared optical transmission system 200B, the end of the connection cable 302 that is opposite to the end thereof to which the connector 303 is connected is supplied with the modulated RF signal RFM on which the DC power supply voltage DC2 is superposed. Therefore, an infrared signal SIR corresponding to the modulated RF signal MRF is output from the infrared optical transmission section 301.

Japanese Patent Application Publication No. Hei 8-288909 has disclosed an apparatus for converting a video signal or an audio signal into an optical signal and transmitting it by means of a space, in which dissipation power can be saved by driving light-emitting means only when it is necessary for an optical signal to be transmitted. For example, if an AV pin plug is connected to an output terminal, a signal reproduced from a VTR block is output to outside through the AV pin plug, and at such a time, a microcomputer supplies an infrared transmission modulator and a light-emitting section with a power supply control signal that turns off the drive voltage.

SUMMARY OF THE INVENTION

In each of the infrared optical transmission apparatus 200A shown in FIGS. 1 and 2 and the infrared optical transmission apparatus 200B shown in FIGS. 3 and 4, even if the infrared optical transmission unit 300 is not connected, the DC power supply voltage DC2 obtained from the regulator 202 appears at the connector 209. Therefore, a short-circuit problem may cause a short-circuit protection circuit equipped with the regulator 202 to operate, or the destruction of, or failures such as burnout in the RF cut-off inductor 210 or a printed circuit board pattern.

Also, in the infrared optical transmission apparatus 200A shown in FIGS. 1 and 2, even if the infrared optical transmission unit 300 is connected, an infrared signal SIR that corresponds to the modulated RF signal MRF is output from the infrared optical transmission section 201, thereby dissipating power wastefully, or accelerating deterioration in the infrared optical transmission section 201.

Further, according to an invention described in the above Japanese Patent Application Publication, for example, the attachment and detachment of the AV pin plug is detected mechanically. This may prevent an electrical connection from being detected certainty. Thus, when a signal reproduced from the VTR block is not output to the outside through the AV pin plug, the microcomputer may supply the infrared transmission modulator and the light-emitting section with a control signal that turns off the drive voltage. Further, this Japanese publication has not disclosed how a DC power supply voltage to a connector which is provided with a modulated RF signal on which a DC power supply voltage is superposed can be controlled on the basis of whether or not the infrared optical transmission unit is connected to the connector.

It is desirable to provide an electronic device, a transmission system, and the like to be able to avoid a short-circuit protection circuit being operated, or the destruction of, or a failure such as burnout in an RF cut-off inductor or a printed circuit board pattern, as a result of short-circuiting of a connector arising when an external device is not connected.

According to an embodiment of the invention, there is provided an electronic device including a first signal path that supplies an input signal, a first power supply path that supplies a voltage, and a connector that transmits to an external device the input signal on which the voltage has been superposed. The connector is supplied with the input signal by way of the first input path and supplied with the voltage by way of the power supply path. The electronic device also includes a first power supply switch inserted into the first power supply path and an amplitude detector that detects at the connector an amplitude of the input signal on which the voltage has been superposed. The electronic device further includes a control section that determines on the basis of a detection output from the amplitude detector, which at least a connection condition of the external device to the connector is a first condition in which the external device is not connected to the connector or a second condition in which the external device is connected to the connector. On the basis of the connection condition, the control section controls the first power supply switch to perform any one of turning on and off the first power supply switch.

According to the embodiment of the present invention, a connector for connecting an external device (a transmission unit) is provided. The connector is supplied with an input signal through a first signal path. The connector is also supplied with a voltage through a first power supply path. A first power supply switch is inserted into this first power supply path.

An amplitude of a signal at the connector is detected. On the basis of an output of this amplitude that has been detected, it is at least determined which one of two connection conditions has been reached. This is, in a first condition, an external device is not connected to the connector, and in a second condition, it is connected to the connector. Since the output that is detected in the first condition is of a higher level than that in a second condition, by comparing the detected output with a predetermined threshold value, it is possible to determine whether the first or the second condition has been reached.

In the second condition, a first power supply switch is turned on. Therefore, the connector is provided with a modulated RF signal on which a DC power supply voltage is superposed, so that an output signal that corresponds to an input signal can be provided from a first signal transmission section in the external device that is connected to this connector.

In contrast, in the first condition, the first power supply switch is turned off. Accordingly, the connector is provided with no voltage. Therefore, even when the connector has been short-circuited in a condition where no external device is connected to the connector, operation of the short-circuit protection circuit, or a destruction of, or a failure such as burnout in the RF cut-off inductor or of the printed circuit board pattern does not occur. It is be noted that the short-circuit protection circuit is equipped with, for example, a regulator for obtaining a voltage.

On the basis of a detected output of an amplitude of a signal that appears at the connector, it is further determined whether or not a third condition has been reached in which the connector has been short-circuited. In the third condition, a detected output is 0, so that by comparing this detected output with a predetermined threshold value, it is possible to determine whether the third condition has been reached. In the third condition, the first power supply switch is turned off. Accordingly, even when the connector has been short-circuited in a condition where an external device is connected to the connector, this connector immediately comes to be provided with no voltage, thereby preventing operation of the short-circuit protection circuit or destruction of, or failure such as burnout in the RF cut-off inductor or the printed circuit board pattern form occurring.

For example, in the third condition, a warning of short-circuit problem is given. This notification is made by use of a display, by means of methods such as the production of a voice from a speaker, by the light emission from a light-emitting element, and by production of a buzzer sound. This allows a user to be easily apprised of the short-circuit problem in the connector, and to take any remedial actions.

For example, according to another embodiment of the present invention, the electronic device further has a second signal transmission section, a second signal path for supplying an input signal to this second signal transmission section, a second power supply path for supplying a voltage to the second signal transmission section, and a second power supply switch inserted into this second power supply path. The second power supply switch is turned on in the first condition and turned off in the second condition.

Accordingly, if no external device is connected to the connector, an output signal that corresponds to an input signal is output from the second signal transmission section that is built in an electric device. In contrast, if an external device is connected to the connector, the output signal that corresponds to the input signal is output from the first signal transmission section in this external device, and no signal is output from the first signal transmission section built in the electronic device. This avoids the occurrence of a situation of wasteful power dissipation in which output signals are simultaneously output from the first signal transmission section in the external device and from the second signal transmission section that is built in the electronic device.

The concluding portion of this specification particularly points out and directly claims the subject matter of the present invention. However, those skilled in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWINGS

FIG. 2 is an electrical schematic diagram for showing a circuit configuration of the infrared optical transmission apparatus (having an infrared optical transmission section) as related art;

FIG. 7 is a table for showing operations of various circuits in a variety of conditions of the infrared optical transmission apparatus;

FIG. 8 is a timing chart for showing variations in outputs of comparators, and whether a power supply switch is turned on or off, in a condition (condition A) where an infrared optical transmission unit is not connected to a connector and in a condition (condition B) where the infrared optical transmission unit is connected to the connector;

FIG. 9 is a timing chart for showing variations in outputs of comparators, and whether a power supply switch is turned on or off, in a condition (condition A) where an infrared optical transmission unit is not connected to the connector and in a condition (condition C) where the connector is short-circuited.

DESCRIPTION OF THE PREFERRED EMBODIMENTS

Figure 1:
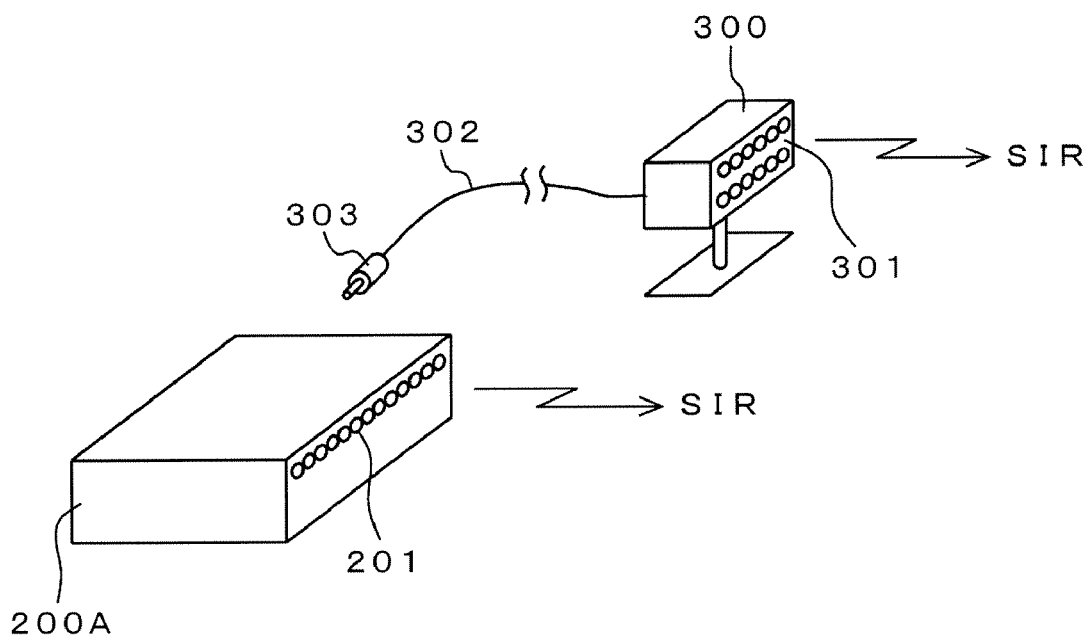
FIG. 1 is a drawing for showing a configuration of an infrared optical transmission apparatus (having an infrared optical transmission section) as related art.
Figure 3:
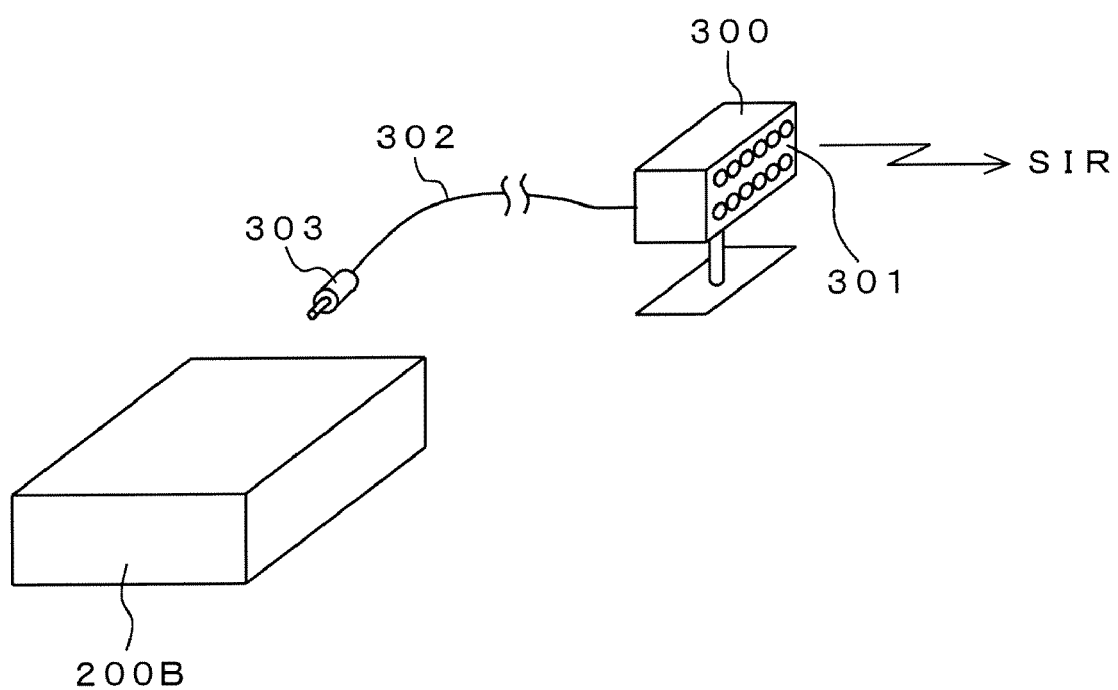
FIG. 3 is a diagram for showing a configuration of an infrared optical transmission apparatus (having no infrared optical transmission section) as related art.
Figure 4:
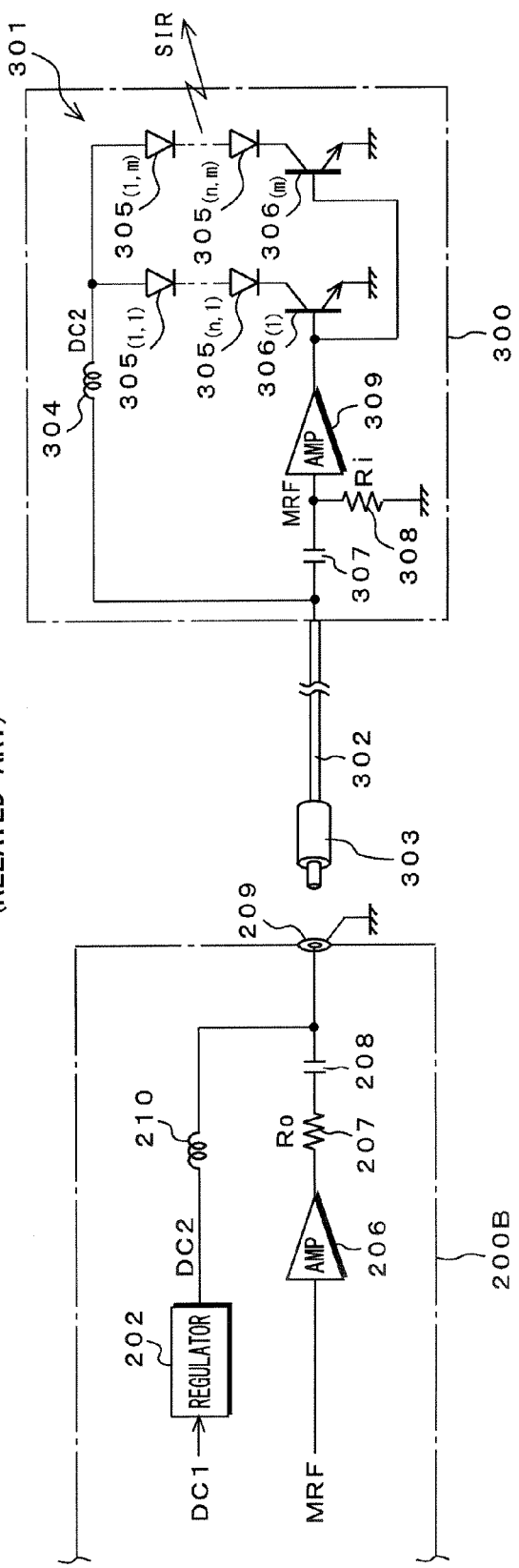
FIG. 4 is an electrical schematic diagram for showing a circuit configuration of the infrared optical transmission apparatus (having no infrared optical transmission section) as related art.
Figure 5:
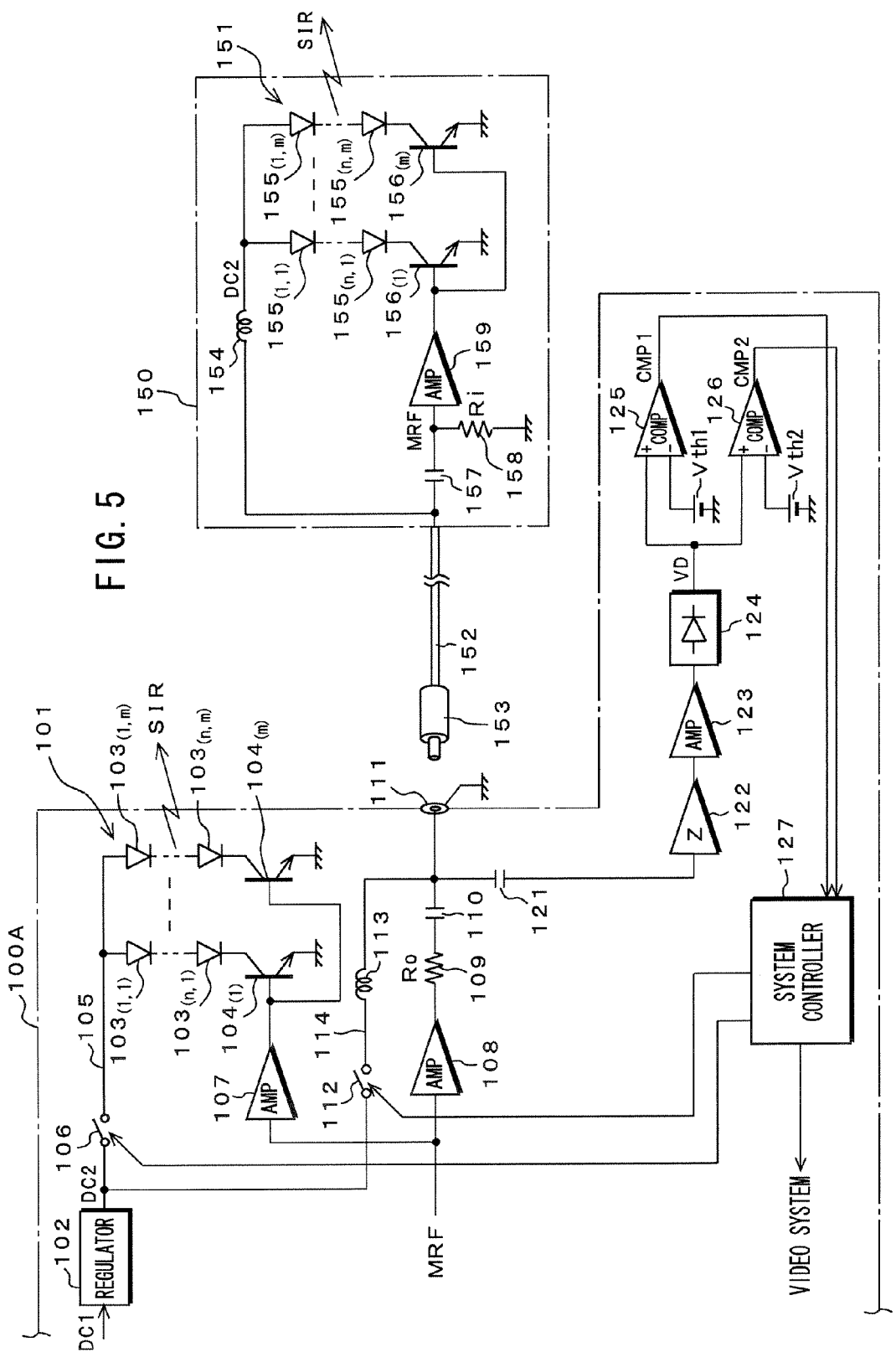
FIG. 5 is an electrical schematic diagram for showing a configuration of an infrared optical transmission apparatus according to a first embodiment of the invention.

The following will describe a first embodiment of the present invention. FIG. 5 shows a configuration of an infrared optical transmission apparatus 100A according to the first embodiment.

A DC power supply voltage DC1 of, for example, 12V obtained from a power supply circuit, not shown, is supplied to a regulator 102 from which a stabilized DC power supply voltage DC2 of, for example, 9V is obtained.

An output side of the regulator 102 is connected to a collector of an NPN driver transistor 104(1), whose emitter is grounded, through a series circuit constituted of infrared light-emitting diodes 103(1, 1) through 103(n, 1). The output side of the regulator 102 is also connected to a collector of an NPN driver transistor 104(m), whose emitter is grounded, through a series circuit constituted of infrared light-emitting diodes 103(1, m) through 103(n, m). Herein, n=3 and m=4, for example, are used. These n times m number of infrared light-emitting diodes 103(1, 1) through 103(n, m) constitute an infrared optical transmission section 101.

As described above, a power supply switch 106 is inserted into a power supply path 105 for supplying the DC power supply voltage DC2 from the regulator 102 to the infrared optical transmission section 101. It is to be noted that the power supply path 105 constitutes a second power supply path, and that the power supply switch 106 constitutes a second power supply switch.

An amplifier 107 receives and amplifies a modulated RF signal MRF obtained from a modulation circuit, not shown. An output side of this amplifier 107 is connected to a base of each of the transistors 104(1) through 104(m). It is to be noted that the modulated RF signal MRF is obtained, for example, by performing digital modulation on a carrier wave by using audio data or image data, and produced so as to have a constant amplitude. A signal path into which this amplifier 107 is inserted constitutes a second signal path for supplying the modulated RF signal MRF to the infrared optical transmission section 101.

An amplifier 108 receives and amplifies the modulated RF signal MRF obtained from the modulation circuit, not shown. An output side of this amplifier 108 is connected to a connector (jack) 111 through a series circuit constituted of an output resistor 109 and a DC cut-off capacitor 110. A signal path into which the amplifier 108, the output resistor 109, and the DC cut-off capacitor 110 are inserted constitutes a first signal path that supplies the modulated RF signal MRF to the connector 111.

Further, the output side of the regulator 202 described above is connected to the connector 111 by way of a power supply switch 112 and an RF cut-off inductor 113. It is to be noted that the power supply switch 112 constitutes a first power supply switch, and that a power supply path 114 into which the power supply switch 112 and the RF cut-off inductor 113 are inserted constitutes a first power supply path for supplying a DC power supply voltage DC2 to the connector 111.

Further, the connector 111 is connected through a DC cut-off capacitor 121 to an input side of a series circuit constituted of an impedance converter 122, an amplifier 123, and an RF detector 124. The DC cut-off capacitor 121 constitutes a filter for extracting only the modulated RF signal MRF to be output to the connector 111. The series circuit constituted of the impedance converter 122, the amplifier 123, and the RF detector 124 constitutes an amplitude detection section that detects an amplitude of the modulated RF signal MRF.

The impedance converter 122 has a high level of impedance on its input side and a low level of impedance on its output side. Since the input side is higher in terms of impedance, it is possible to detect an amplitude of the modulated RF signal MRF without affecting this modulated RF signal MRF. The amplifier 123 amplifies an amplitude of the modulated RF signal MRF that has been converted by the impedance converter 122 to a low impedance signal. The RF detector 124 detects the modulated RF signal MRF that has been amplified by the amplifier 123, so as to output a DC voltage VD that is proportional to the amplitude.

Further, an output side of the RF detector 124 is connected to positive input terminals of comparators 125 and 126. A negative input terminal of the comparator 125 is supplied with a reference voltage Vth1. A value of this reference voltage Vth1 is set to an intermediate value of the following two values. These two values are respectively a value of an output DC voltage VD of the RF detector 124 in a condition (condition A) where an infrared optical transmission unit is not connected to the connector 111, and a value of the output DC voltage VD of the RF detector 124 in a condition (condition B) where the infrared optical transmission unit is connected to the connector 111.

A output CMP1 of this comparator 125 indicates a high level "H" if the value of the output DC voltage VD of the RF detector 124 is greater than a value of the reference voltage Vth1 and conversely, indicates a low level "L" if the value of the output DC voltage VD of the RF detector 124 is not greater than the value of the reference voltage Vth1. It is thus possible, by utilizing the output of the comparator 125, to determine which condition A or B has been reached.

A negative input terminal of the comparator 126 is supplied with a reference voltage Vth2. This reference voltage Vth2 is set to an intermediate value of the following two values. These two values are respectively a value of the output DC voltage VD of the RF detector 124 in condition (condition B) where the infrared optical transmission unit is connected to the connector 111, and a value of the output DC voltage VD of the RF detector 124 in a condition (condition C) where the connector 111 is short-circuited.

An output CMP2 of this comparator 126 indicates a high level "H" if the value of the output DC voltage VD of the RF detector 124 is greater than a value of a reference voltage Vth2 and conversely, indicates a low level "L" if the value of the output DC voltage VD of the RF detector 124 is not greater than the value of the reference voltage Vth2. It is thus possible, by utilizing the output of the comparator 126, to determine whether or not the condition C has been reached.

Further, the infrared optical transmission apparatus 100A has a system controller 127. This system controller 127 constitutes a control section. The system controller 127 receives the outputs CMP1 and CMP2 of the comparators 125 and 126 described above. This system controller 127 controls the power supply switches 106 and 112 on the basis of outputs CMP1 and CMP2 of the comparators 125 and 126 to turn on or off each of the power supply switches 106 and 112.

In other words, if the outputs CMP1 and CMP2 of the comparators 125 and 126 both indicate high levels "H", the power supply switch 106 is turned on and the power supply switch 112 is turned off. If the output CMP1 of the comparator 125 indicates a low level "L" and the output CMP2 of the power supply switch 126 indicates a high level "H", the power supply switch 106 is turned off, and the power supply switch 112 is turned on. If the outputs CMP1 and CMP2 of the comparators 125 and 126 both indicate low levels "L", the power supply switch 106 is maintained in its pre-short-circuit condition and the power supply switch 112 is turned off.

Further, if the output CMP2 of the comparator 126 indicates a low level "L" in the condition (the condition C) where the connector 111 has been short-circuited, the system controller 127 controls a video system so that a warning of a short-circuit problem can be displayed on a screen.

The following will describe, with reference to FIG. 5, a configuration of an infrared optical transmission unit 150 which is connected to the connector (jack) 111 of this infrared optical transmission apparatus 100A.

An end of a connection cable 152 opposite to an end thereof to which a connector (plug) 153 is connected is connected to one end of an RF cut-off inductor 154. The other end of this RF cut-off inductor 154 is connected to a collector of an NPN driver transistor 156(1), whose emitter is grounded, through a series circuit constituted of infrared light-emitting diodes 155(1, 1) through 155(n, 1). The other end of the RF cut-off inductor 154 is also connected to a collector of an NPN driver transistor 156(m), whose emitter is grounded, through a series circuit constituted of infrared light-emitting diodes 155(1, m) through 155(n, m). Herein, n=3 and m=4, for example, are used. Thus, n times m number of infrared light-emitting diodes 155(1, 1) through 155(n, m) constitute an infrared optical transmission section 151.

Further, the end of the connection cable 152 opposite to the end thereof to which the connector 153 is connected is also grounded through a series circuit constituted of a DC cut-off capacitor 157 and an input resistor 158. A node between the capacitor 157 and the input resistor 158 is connected to the base of each of the transistors 156(1) through 156(m) through an amplifier 159.

The following describe operations of this infrared optical transmission unit 150.

When the connector (plug) 153 is connected to the connector (jack) 111 of the infrared optical transmission apparatus 100A, the end of the connection cable 152 opposite to the end thereof to which the connector 153 is connected is supplied with the modulated RF signal MRF on which the DC power supply voltage DC2 is superposed. Therefore, the DC power supply voltage DC2 appears at the other end of the RF cut-off inductor 154. This DC power supply voltage DC2 is supplied as power to the infrared optical transmission section 151.

Further, the node between the DC cut-off capacitor 157 and the input resistor 158 is supplied with the modulated RF signal MRF. This modulated RF signal MRF is amplified by the amplifier 159 and then supplied as a drive signal to the base of each of the transistors 156(1) through 156(m). Accordingly, the diodes 155(1, 1) through 155(n, m) emit light in response to the modulated RF signal MRF, so that an infrared signal SIR corresponding to the modulated RF signal MRF can be output from the infrared optical transmission section 151.

Figure 6A:
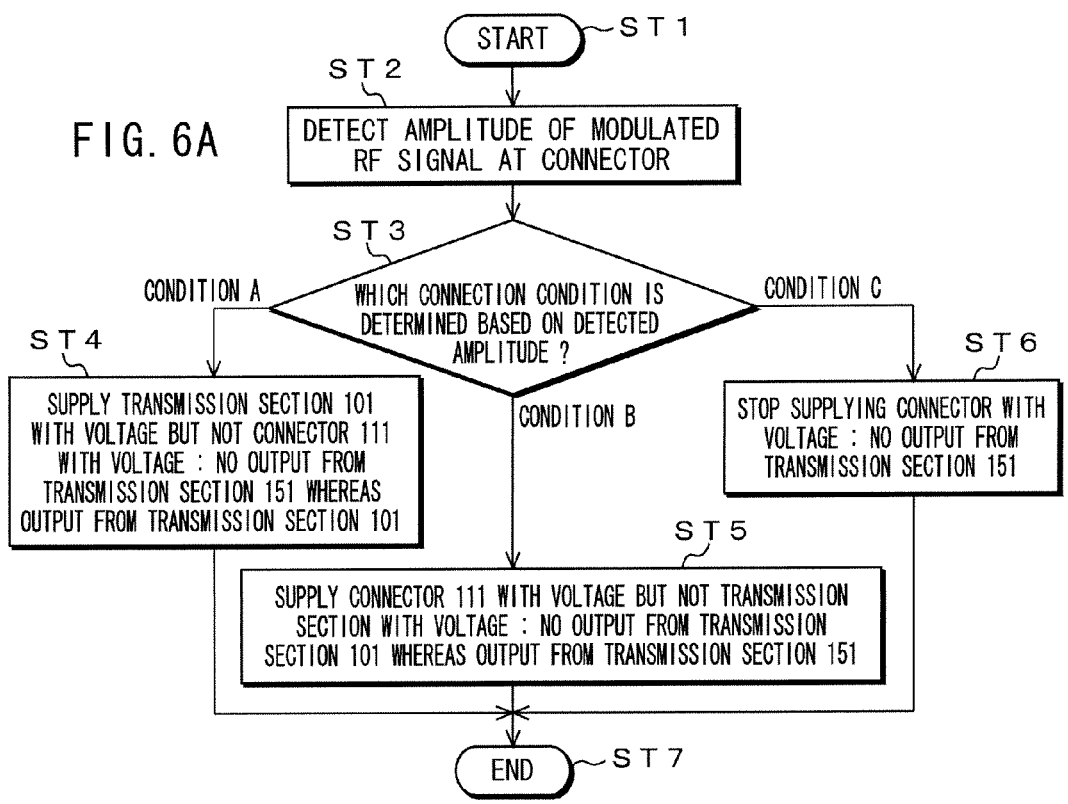
FIG. 6A is a flowchart for showing operation of the infrared optical transmission apparatus 100A and FIG. 6B is a flowchart for showing another operation of the infrared optical transmission apparatus 100A.

The following will describe operations of the infrared optical transmission apparatus 100A described above with reference to FIGS. 6A and 6B.

First, an operation of the infrared optical transmission apparatus 100A starts in Step ST1. Then, in Step ST2, the amplitude detection section detects an amplitude of the modulated RF signal MRF at the connector 111. Then, in Step ST3, it is determined which is a connection condition of the external device, namely, the infrared optical transmission unit 150, to the connector 111 on the basis of the detected amplitude.

A case in which a connection condition (condition A) where the infrared optical transmission unit 150 is connected to the connector 111 is determined as the connection condition of the external device at step ST4 will be described.

In this circumstance, when an amplitude of the modulated RF signal MRF at the output side of the amplifier 108 is Vpp, the connector 111 is provided with an amplitude Vpp of the modulated RF signal MRF; the impedance converter 122 provides an output amplitude of Vpp; the amplifier 123 provides an output amplitude of GVpp (where G is a voltage gain of the amplifier 123); and the RF detector 124 provides voltage of KGVpp (where K is a detection/conversion efficiency factor of the RF detector 124) as its output DC voltage VD.

Moreover, in this circumstance, the reference voltage Vth1 of the comparator 125 is set to $(1/2) \cdot \{(Ro+2Ri)/(Ro+Ri)\} \cdot KGVpp$, and the reference voltage Vth2 of the comparator 126 is set to $(1/2) \cdot \{Ri/(Ro+Ri)\} \cdot KGVpp$. Accordingly, the outputs CMP1 and CMP2 of the respective comparators 125 and 126 both indicate high levels "H". The system controller 127 then determines that the infrared optical transmission unit 150 is not connected to the connector 111 (condition A), to turn on the power supply switch 106 and to turn off the power supply switch 112.

For these reasons, the power supply DC voltage DC2 obtained from the regulator 102 is supplied as power to the infrared optical transmission section 101 through the power supply switch 106. Further, the modulated RF signal MRF obtained from the modulation circuit is amplified by the amplifier 107 and then supplied as a drive signal to the base of each of the transistors 104(1) through 104(m). Accordingly, the diodes 104(1, 1) through 103(n, m) emit light in response to the modulated RF signal MRF, so that an infrared signal SIR corresponding to the modulated RF signal MRF can be output from the built-in infrared optical transmission section 101.

It is to be noted that the modulated RF signal obtained from the modulation circuit is also amplified by the amplifier 108 and then supplied to the connector 111 through a series circuit constituted of the output resistor 109 and the DC cut-off capacitor 110. However, the power supply switch 112 is turned off, so that the power supply DC voltage DC2 obtained by the regulator 102 is accordingly not supplied to the connector 111.

At step ST7, the operation then ends.

Next, a case in which a connection condition (condition B) where the infrared optical transmission unit 150 is connected to the connector 111 is determined as the connection condition of the external device at step ST5 will be described.

In this circumstance, when an amplitude of the modulated RF signal MRF at the output side of the amplifier 108 is Vpp, the connector 111 is provided with an amplitude of $\{Ri/(Ro+Ri)\} \cdot Vpp$ of the modulated RF signal MRF; the impedance converter 122 provides an output amplitude of $\{Ri/(Ro+Ri)\} \cdot Vpp$; the amplifier 123 provides an output amplitude of $\{Ri/(Ro+Ri)\} \cdot GVpp$; and the RF detector 124 provides voltage of $\{Ri/(Ro+Ri)\} \cdot KGVpp$ as its output DC voltage VD.

Moreover, in this circumstance, the reference voltage Vth1 of the comparator 125 is set to (½)·{(Ro+2Ri)/(Ro+Ri)}·KGVpp and the reference voltage Vth2 of the comparator 126 is set to (½)·{Ri/(Ro+Ri)}·KGVpp. Accordingly, an output CMP1 of the comparator 125 indicates a low level "L" and an output CMP2 of the comparator 126 indicates a high level "H". The system controller 127 then determines that the infrared optical transmission unit 150 is connected to the connector 111 (condition B), to turn off the power supply switch 106 and to turn on the power supply switch 112.

Accordingly, the power supply DC voltage DC2 obtained from the regulator 102 is supplied to the connector 111 through the power supply switch 112 and the RF cut-off inductor 113. The modulated RF signal MRF obtained from the modulation circuit is amplified by the amplifier 108 and then supplied to the connector 111 through the series circuit constituted of the output resistor 109 and the DC cut-off capacitor 110. Accordingly, the connector 111 is provided with the modulated RF signal MRF on which the power supply DC voltage DC2 is superposed.

In such a manner, at the connector 111, the modulated RF signal MRF appears on which the power supply DC voltage DC2 is superposed. This enables an infrared signal SIR corresponding to the modulated RF signal MRF to be output from the infrared optical transmission section 151 in the infrared optical transmission unit 150 connected to this connector 111.

It is to be noted that the power supply switch 106 is turned off, so that the power supply DC voltage DC2 obtained from the regulator 102 is not supplied to the built-in infrared optical transmission section 101. Therefore, none of the diodes 103(1, 1) through 103(n, m) emits light, and an infrared signal SIR corresponding to the modulated RF signal MRF is not output.

At the step ST7, the operation then ends.

Further, a case in which a connection condition (condition C) where the connector 111 has been short-circuited is determined as the connection condition of the external device at step ST6 will be described.

In this circumstance, when an amplitude of the modulated RF signal MRF at the output side of the amplifier 108 is Vpp, the connector 111 is provided with an amplitude of zero of the modulated RF signal MRF; the impedance converter 122 provides an output amplitude of zero; the amplifier 123 provides an output amplitude of zero; and the RF detector 124 provides voltage of zero as its output DC voltage VD.

Moreover, in this circumstance, the reference voltage Vth1 of the comparator 125 is set to (½)·{(Ro+2Ri)/(Ro+Ri)}·KGVpp and the reference voltage Vth2 of the comparator 126 is set to (½)·{(Ri/(Ro+Ri)}·KGVpp. Accordingly, the outputs CMP1 and CMP2 of the respective comparators 125 and 126 both indicate low levels "L". The system controller 127 then determines that the connector 111 has been short-circuited (condition C), to hold the power supply switch 106 in the pre-short-circuit condition and to turn off the power supply switch 112.

Accordingly, the power supply DC voltage DC2 obtained from the regulator 102 is not supplied to the connector 111. It is to be noted that the modulated RF signal MRF obtained from the modulation circuit is amplified by the amplifier 108, and then supplied to the connector 111 through the series circuit constituted of the output resistor 109 and the DC cut-off capacitor 110.

Further, the power supply switch 106 is maintained in the pre-short-circuit condition thereof, so that if the power supply switch 106 is turned on in a condition (condition A) where the infrared optical transmission unit 150 is not connected, the power supply switch 106 is held in an on-state even after the connector 111 has been short-circuited. Further, if the power supply switch 106 is turned off in a condition (condition B) where the infrared optical transmission unit 150 is connected, the power supply switch 106 is held in an off-state even after the connector 111 has been short-circuited.

Figure 6B:
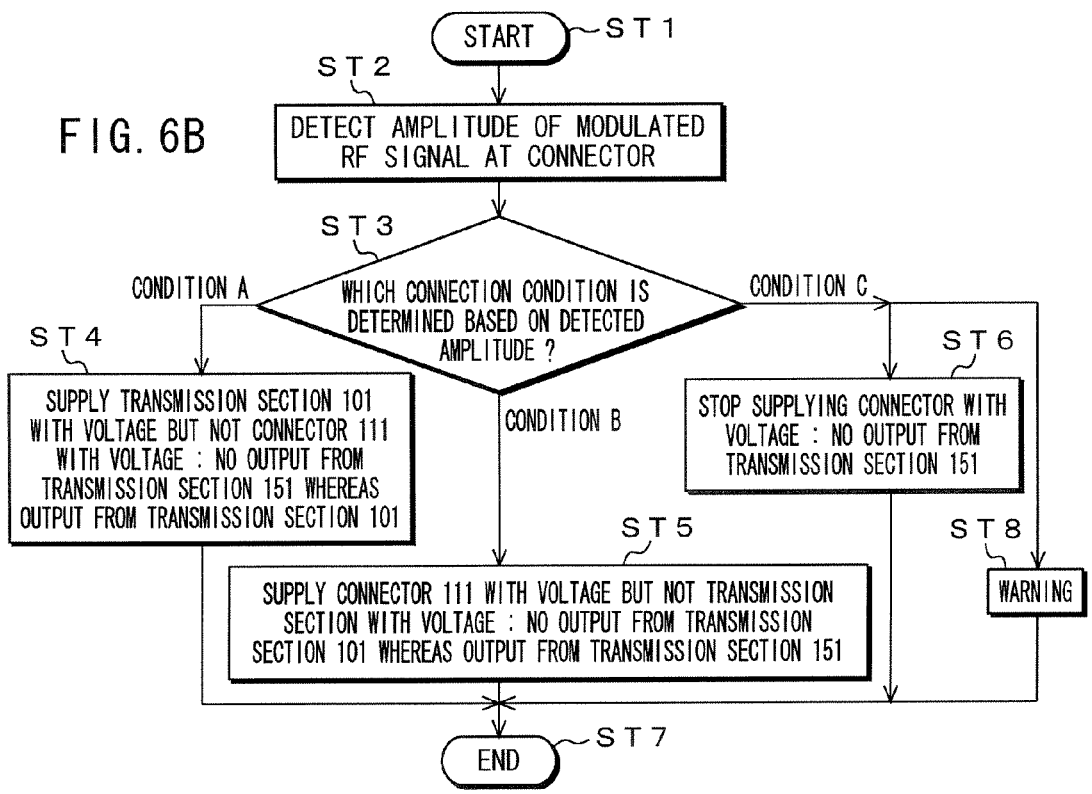

Alternatively, if it is determined that the connector 111 has been short-circuited (condition C), the system controller 127 controls the video system so as to enable a warning of a short-circuit problem to be displayed on a screen at step ST8 shown in FIG. 6B.

FIG. 7 shows a summary of operations of the circuits in the various conditions described above. FIG. 8 shows changes in outputs CMP1 and CMP2 of the comparators 125, 126 and the turning on and off of the power supply switches 112, 106 in response to changes between condition A and condition B. Further, FIG. 9 shows changes in outputs CMP1 and CMP2 of the comparators 125, 126 and the turning on and off of the power supply switches 112, 106 in response to changes between condition A and condition B.

According to the infrared optical transmission apparatus 100A described above, in the condition (condition A) where the infrared optical transmission unit 150 is not connected to the connector 111, the power supply switch 112 is turned off, so that the power supply DC voltage DC2 is not output to the connector 111. Therefore, even if this connector has been short-circuited, a power supply DC voltage is not output to the connector 111, and an operation of the short-circuit protection circuit in the regulator 102 or the destruction of, or a failure such as burnout in the RF cut-off inductor 110 or the printed circuit board pattern do not occur.

Further, according to the infrared optical transmission apparatus 100A described above, in the condition (condition B) where the infrared optical transmission unit 150 is connected to the connector 111, the power supply switch 106 is turned off. An infrared signal SIR corresponding to the modulated RF signal is not be output from the built-in infrared optical transmission section 101. This avoids a wasteful dissipation situation of electric power from occurring, specifically a situation where the infrared signal SIR is output not only from the infrared optical transmission section 151 in the infrared optical transmission unit 150 but also from the built-in infrared optical transmission section 101.

Furthermore, according to the infrared optical transmission apparatus 100A described above, in the condition (condition C) where the connector 111 has been short-circuited, the power supply switch 112 is turned off and the power supply DC voltage DC2 is accordingly not output to the connector 111. Therefore, even when this connector 111 has been short-circuited in a condition where the infrared optical transmission unit 150 is connected to the connector 111, the connector 111 will not immediately be provided with the power supply DC voltage DC2. This avoids form occurring an operation of the short-circuit protection circuit in the regulator 102, or the destruction of, or a failure such as burnout in the RF cut-off inductor 110 or the printed circuit board pattern.

Moreover, according to the infrared optical transmission apparatus 100A described above, in the condition (condition C) where the connector 111 has been short-circuited, the video system is controlled so as to enable a warning of a short-circuit problem to be displayed on the screen. It thus becomes possible for a user to learn easily about a short-circuit problem, and to take any remedial action thereto.

Figure 10:
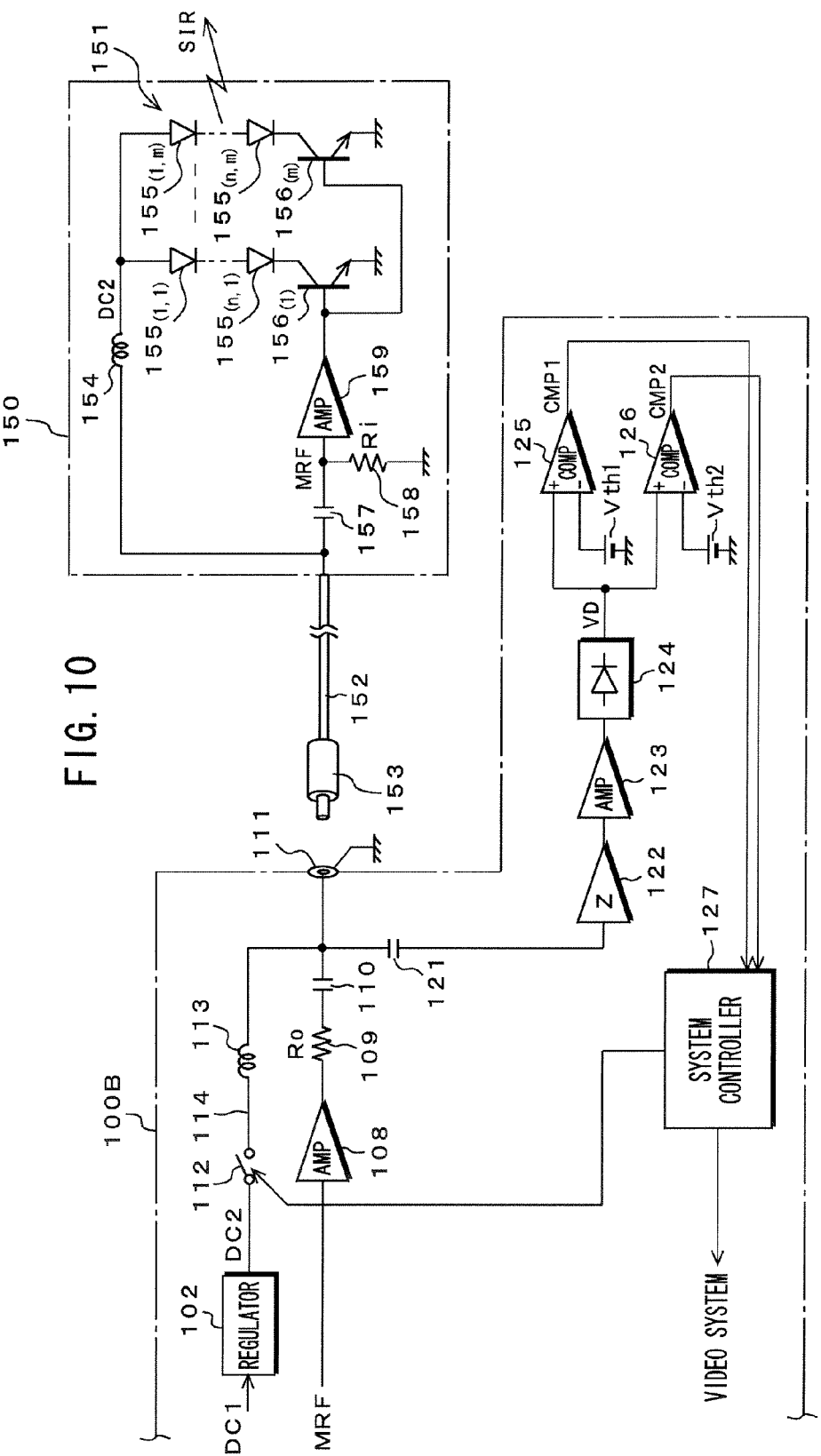
FIG. 10 is an electrical schematic diagram for showing a configuration of an infrared optical transmission apparatus according to a second embodiment of the invention.

The following will describe a second embodiment of the present invention. FIG. 10 shows a configuration of an infrared optical transmission apparatus 100B according to the second embodiment.

This infrared optical transmission apparatus 100B is identical to the infrared optical transmission apparatus 100A described above, except the infrared light-emitting diodes 103(1, 1) through 103(n, m), the transistors 104(1) through 104(m), the power supply switch 106, and the amplifier 107.

The following will describe operations of this infrared optical transmission apparatus 100B.

An operation in a condition (condition A) where the infrared optical transmission unit 150 is connected to the connector 111 will be described.

In this circumstance, when an amplitude of the modulated RF signal MRF at an output side of the amplifier 108 is Vpp, the connector 111 is provided with the amplitude of Vpp of the modulated RF signal MRF; the impedance converter 122 provides an output amplitude of Vpp; the amplifier 123 provides an output amplitude of GVpp (where G is a voltage gain of the amplifier 123); and the RF detector 124 provides voltage KGVpp as its output DC voltage VD (where K is a detection/conversion efficiency factor of the RF detector 124).

Moreover, in this circumstance, the reference voltage Vth1 of the comparator 125 is set to $(\tfrac{1}{2})\cdot\{(Ro+2Ri)/(Ro+Ri)\}\cdot KGVpp$ and the reference voltage Vth2 of the comparator 126 is set to $(\tfrac{1}{2})\cdot\{Ri/(Ro+Ri)\}\cdot KGVpp$. Accordingly, the outputs CMP1 and CMP2 of the respective comparators 125 and 126 both indicate high levels "H". The system controller 127 then determines that the infrared optical transmission unit 150 is not connected to the connector 111 (condition A) to turn off the power supply switch 112.

Accordingly, the power supply DC voltage DC2 obtained from the regulator 102 is not supplied to the connector 111. It is to be noted that the modulated RF signal MRF obtained from the modulation circuit is amplified by the amplifier 108, and then supplied to the connector 111 through the series circuit constituted of the output resistor 109 and the DC cut-off capacitor 110.

Next, an operation in a condition (condition B) where the infrared optical transmission unit 150 is connected to the connector 111 will be described.

In this circumstance, when an amplitude of the modulated RF signal MRF at the output side of the amplifier 108 is Vpp, the connector 111 is provided with an amplitude of $\{(Ri/(Ro+Ri)\}\cdot Vpp$ of the modulated RF signal MRF; the impedance converter 122 provides an output amplitude of $\{Ri/(Ro+Ri)\}\cdot Vpp$; the amplifier 123 provides an output amplitude of $\{Ri/(Ro+Ri)\}\cdot GVpp$; and the RF detector 124 provides voltage of $\{Ri/(Ro+Ri)\}\cdot KGVpp$ as its output DC voltage VD.

Moreover, in this circumstance, the reference voltage Vth1 of the comparator 125 is set to $(\tfrac{1}{2})\cdot\{(Ro+2Ri)/(Ro+Ri)\}\cdot KGVpp$ and the reference voltage Vth2 of the comparator 126 is set to $(\tfrac{1}{2})\cdot\{Ri/(Ro+Ri)\}\cdot KGVpp$. Accordingly, the output CMP1 of the comparator 125 indicates a low level "L" and the output CMP2 of the comparator 126 indicates a high level "H". The system controller 127 then determines that the infrared optical transmission unit 150 is connected to the connector 111 (condition B) to turn on the power supply switch 112.

Accordingly, the power supply DC voltage DC2 obtained from the regulator 102 is supplied to the connector 111 through the power supply switch 112 and the RF cut-off inductor 113. The modulated RF signal MRF obtained from the modulation circuit, not shown, is amplified by the amplifier 108 and then supplied to the connector 111 through the series circuit constituted of the output resistor 109 and the DC cut-off capacitor 110. Accordingly, the connector 111 is provided with the modulated RF signal MRF on which the power supply DC voltage DC2 is superposed.

In such a manner, at the connector 111, the modulated RF signal MRF appears on which the power supply DC voltage DC2 is superposed, so that an infrared signal SIR corresponding to the modulated RF signal MRF is output from the infrared optical transmission section 151 in the infrared optical transmission unit 150 connected to this connector 111.

Further, an operation in a condition (condition C) where the connector 111 has been short-circuited will be described.

In such circumstance, when an amplitude of the modulated RF signal MRF at the output side of the amplifier 108 is Vpp, the connector 111 is provided with an amplitude of zero of the modulated RF signal MRF; the impedance converter 122 provides an output amplitude of zero; the amplifier 123 provides an output amplitude of zero; and the RF detector 124 provides voltage of zero as its output DC voltage VD.

Moreover, in such circumstance, the reference voltage Vth1 of the comparator 125 is set to $(\tfrac{1}{2})\cdot\{(Ro+2Ri)/(Ro+Ri)\}\cdot KGVpp$ and the reference voltage Vth2 of the comparator 126 is set to $(\tfrac{1}{2})\cdot\{Ri/(Ro+Ri)\}\cdot KGVpp$. Accordingly, the outputs CMP1 and CMP2 of the respective comparator 125 and 126 both indicate low levels "L". The system controller 127 then determines that the connector 111 has been short-circuited (condition C) to turn off the power supply switch 112.

Accordingly, the power supply DC voltage DC2 obtained from the regulator 102 is not supplied to the connector 111. It is to be noted that the modulated RF signal MRF obtained from the modulation circuit is amplified by the amplifier 108, and then supplied to the connector 111 through the series circuit constituted of the output resistor 109 and the DC cut-off capacitor 110.

Alternatively, if it is determined that the connector 111 has been short-circuited (condition C), the system controller 127 controls the video system so as to enable a warning of a short-circuit problem to be displayed on a screen.

According to the above-described infrared optical transmission apparatus 100B, in the condition (condition A) where the infrared optical transmission unit 150 is not connected to the connector 111, the power supply switch 112 is turned off, so that the power supply DC voltage DC2 is accordingly not output to the connector 111. Therefore, even when this connector has been short-circuited, a power supply DC voltage is not output to the connector 111. This avoids an operation of the short-circuit protection circuit in the regulator 102, or the destruction of, or a failure such as burnout in the RF cut-off inductor 110 or the printed circuit board pattern from occurring.

Also, according to the infrared optical transmission apparatus 100B described above, in the condition (condition B) where the infrared optical transmission unit 150 is connected to the connector 111, the power supply switch 112 is turned off, so that the power supply DC voltage DC2 is accordingly not output to the connector 111. Accordingly, even when the connector 111 has been short-circuited in a condition where the infrared optical transmission unit 150 is connected to this connector, the connector 111 immediately reaches a situation in which it is not provided with the power supply DC voltage DC2. This avoids an operation of the short-circuit protection circuit in the regulator 1102, or of the destruction of, or failure such as burnout in the RF cut-off inductor 110 or the printed circuit board pattern from occurring.

Further, according to the infrared optical transmission apparatus 100B described above, in the condition (condition C) where the connector 111 has been short-circuited, the video system is controlled so as to enable a warning of a short-circuit problem to be displayed on the screen. It thus becomes possible for a user to learn easily about a short-circuit problem, and to take any remedial action thereto.

Although according to the above embodiments, it has been described that a warning of a short-circuit problem is displayed on the screen, the present invention can also be applied to an embodiment for notifying a user of a short-circuit problem by using other types of notification section. For example, a warning of a short-circuit problem can be notified by the production of a sound output from a speaker, the emission of light from a light-emitting element, or the generation of a buzzer sound.

Although it has not specifically been described above, connection information to the effect that the infrared optical transmission unit 150 is connected to the connector 111 can be applied to functions and signal processing in the device by means of the system controller 127. For example, in a device for sending rear sounds on 5.1 channel surrounds by use of an infrared optical transmission, the connection information described above can be recognized as a selection of the surrounds, and changes made to the functions and signal-processing in the device.

According to embodiments of the present invention, in circumstances where the optical transmission unit is not connected, the occurrence can be avoided of an operation of a short-circuit protection circuit, or of the destruction of, or a failure such as burnout in the RF cut-off inductor or a printed circuit board pattern, resulting from short-circuiting of the connector. Thus, the embodiments of invention can be applied to an infrared optical transmission apparatus equipped with a connector for connecting an infrared optical transmission unit.

It should be understood by those skilled in the art that various modifications, combinations, sub-combinations and alternations may occur depending on design requirements and other factors insofar as they are within the scope of the appended claims or the equivalents thereof.

What is claimed is:

1. An electronic device comprising:
   a first signal path that supplies an input signal;
   a first power supply path that supplies a voltage;
   a connector that transmits to an external device the input signal on which the voltage has been superposed, said connector being supplied with the input signal by way of the first input path and supplied with the voltage by way of the power supply path;
   a first power supply switch inserted into the first power supply path;
   an amplitude detector that detects at the connector an amplitude of the input signal on which the voltage has been superposed; and
   a control section that determines on the basis of a detection output from the amplitude detector, at least a connection condition of the external device to the connector is any one of a first condition and a second condition, said first condition in which the external device is not connected to the connector, and said second condition in which the external device is connected to the connector, and, on the basis of the connection condition, controls the first power supply switch to perform any one of turning on and off the first power supply switch.

2. The electronic device according to claim 1 wherein, once having determined that the connection condition is the first condition, the control section controls the first power supply switch to turn off the first power supply switch.

3. The electronic device according to claim 1 wherein once having determined that the connection condition is the second condition, the control section controls the first power supply switch to turn on the first power supply switch.

4. The electronic device according to claim 1 wherein the control section further determines whether the connection condition is a third condition in which the connector is short-circuited; and
   wherein, once having determined that the connection condition is the third condition, the control section controls the first power supply switch to turn off the first power supply switch.

5. The electronic device according to claim 1 wherein the control section further determines whether the connection condition is a third condition in which the connector is short-circuited; and
   wherein, once having determined that the connection condition is the third condition, the control section controls a notification section to make a notification of a warning of a short-circuit problem.

6. The electronic device according to claim 1, further comprising:
   a second signal path that supplies the input signal;
   a second power supply path that supplies the voltage;
   a second power supply switch inserted into the second power supply path; and
   a signal transmission section that adopts as its power the voltage supplied by way of the second power supply path, and transmits an output signal corresponding to the input signal,
   wherein the control section controls the second power supply switch to perform any one of turning on and off of the second power supply switch in response to the connection condition.

7. The electronic device according to claim 6 wherein the signal transmission section transmits the output signal by wireless.

8. The electronic device according to claim 6 wherein, once having determined that the connection condition is the first condition, the control section controls the first and second power supply switches to turn on the first power supply switch and to turn off the second power supply switch.

9. The electronic device according to claim 6 wherein, once having determined that the connection condition is the second condition, the control section controls the first and second power supply switches to turn on the first power supply switch and to turn off the second power supply switch.

10. The electronic device according to claim 6 wherein the control section further determines whether the connection condition is a third condition in which the connector is short-circuited; and
   wherein, once having determined that the connection condition is the third condition, the control section controls the first and second power supply switches to turn off the first power supply switch and to maintain the second power supply switch in a pre-short-circuit condition.

11. A transmission system constituted of a transmission apparatus and a transmission unit, wherein the transmission apparatus comprises:
a first signal path that supplies an input signal;
a first power supply path that supplies a voltage;
a connector, which is supplied with the input signal by way of the first input path and supplied with the voltage by way of the power supply path;
a first power supply switch inserted into the first power supply path;
an amplitude detector that detects at the connector an amplitude of a signal; and
a control section for determining, on the basis of a detection output from the amplitude detector, at least a connection condition of the external device to the connector is any one of a first condition and a second condition, said first condition in which the transmission unit is not connected to the connector, and said second condition in which the optical transmission unit is connected to the connector and, on the basis of the connection condition, controls the first supply switch to perform any one of turning on and off the first power supply switch; and
wherein the transmission unit includes a first signal transmission section that receives from the connector of the transmission apparatus the input signal on which the voltage is superposed, and transmits an output signal corresponding to the input signal.

12. The transmission system according to claim 11 wherein, once having determined that the connection condition is the first condition, the control section controls the first power supply switch to turn off the first power supply switch.

13. The transmission system according to claim 11 wherein, once having determined that the connection condition is the second condition, the control section controls the first power supply switch to turn on the first power supply switch.

14. The transmission system according to claim 11 wherein the control section further determines whether the connection condition is a third condition in which the connector is short-circuited; and
wherein, once having determined that the connection condition is the third condition, the control section controls the first power supply switch to turn off the first power supply switch.

15. The transmission system according to claim 11 wherein the control section further determines whether the connection condition is a third condition in which the connector is short-circuited; and
wherein, once having determined that the connection condition is the third condition, the control section controls a notification section to make a notification of a warning of a short-circuit problem.

16. The transmission system according to claim 11 wherein the transmission apparatus further comprises:
a second signal path that supplies the input signal;
a second power supply path that supplies the voltage;
a second power supply switch inserted into the second power supply path; and
a second signal transmission section that adopts as its power the voltage supplied by way of the second power supply path, and transmits an output signal corresponding to the input signal,
wherein the control section controls the second power supply switch to perform any one of turning on and off of the second power supply switch in response to the connection condition.

17. The transmission system according to claim 16 wherein the first signal transmission section and the second signal transmission section transmit the output signals to each other by wireless.

18. The transmission system according to claim 16 wherein, once having determined that the connection condition is the first condition, the control section controls the first and second power supply switches to turn off the first power supply switch and to turn on the second power supply switch.

19. The transmission system according to claim 16 wherein, once having determined that the connection condition is the second condition, the control section controls the first and second power supply switches to turn on the first power supply switch and to turn off the second power supply switch.

20. The transmission system according to claim 16 wherein the control section further determines whether the connection condition is a third condition in which the connector is short-circuited; and
wherein, once having determined that the connection condition is the third condition, the control section controls the first and second power supply switches to turn off the first power supply switch and to maintain the second power supply switch in a pre-short-circuit condition.

21. A method for determining a connection condition between a connector of an electronic device and an external device, said electronic device supplying an input signal on which a voltage is superposed to the external device by means of the connector, the method comprising steps of:
detecting at the connector an amplitude of the input signal on which the voltage is superposed; and
determining on the basis of the amplitude detected in the above detecting step, at least a connection condition of the external device to the connector is any one of a first condition in which the external device is not connected to the connector and a second condition in which the external device is connected to the connector.

22. The method according to claim 21, further comprising a step of controlling voltage to stop supplying the voltage to the connector when it has been determined that the connection condition is the first condition at the determining step.

23. The method according to claim 21, further comprising a step of controlling voltage to start supplying the voltage to the connector when it has been determined that the connection condition is the second condition at the determining step.

24. The method according to claim 21 wherein the determining step includes a sub-step of determining whether the connection condition is a third condition in which the connector is short-circuited; and
wherein the method further comprises a step of controlling voltage to stop supplying the voltage to the connector when it has been determined that the connection condition is the third condition at the determining step.

25. The method according to claim 21 wherein the determining step includes a sub-step of determining whether the connection condition is a third condition in which the connector is short-circuited; and
wherein the method further comprises a step of notifying a warning of a short-circuit problem when it has been determined that the connection condition is the third condition at the determining step.

26. The method according to claim 21, further comprising a step of outputting an output signal that corresponds to the input signal from the second signal transmission section in the electronic device when it has been determined that the connection condition is the first condition at the determining step.

27. The method according to claim 21, further comprising a step of outputting an output signal that corresponds to the input signal from the first signal transmission section in the electronic device when it has been determined that the connection condition is the second condition at the determining step.

* * * * *